(12) United States Patent
Sharma et al.

(10) Patent No.: US 11,514,403 B2
(45) Date of Patent: Nov. 29, 2022

(54) UTILIZING MACHINE LEARNING MODELS FOR MAKING PREDICTIONS

(71) Applicant: Accenture Global Solutions Limited, Dublin (IE)

(72) Inventors: Girish Sharma, Bangalore (IN); Nishad Rahman, Kerala (IN); Shivani Bhatnagar, Lucknow (IN); Adhiraj Sen, Kolkata (IN); Shruti Sudhakar Marathe, Mumbai (IN); Hemavathy Subramaniam Mohan, Bangalore (IN); Ashok Vira, Bangalore (IN); Neha Gulia, New Delhi (IN); Bhushan Gurmukhdas Jagyasi, Maharashtra (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/949,449

(22) Filed: Oct. 29, 2020

(65) Prior Publication Data

US 2022/0138698 A1 May 5, 2022

(51) Int. Cl.
*G06Q 10/10* (2012.01)
*G06Q 10/06* (2012.01)
*H04L 12/18* (2006.01)

(52) U.S. Cl.
CPC ... *G06Q 10/1053* (2013.01); *G06Q 10/06393* (2013.01); *H04L 12/1818* (2013.01)

(58) Field of Classification Search
CPC ......... G06Q 10/1053; G06Q 10/06393; G06Q 10/10; G06Q 10/105; G06Q 10/1057;
(Continued)

(56) References Cited

U.S. PATENT DOCUMENTS

2003/0191680 A1* 10/2003 Dewar ........... G06Q 10/063112
706/45
2005/0246299 A1* 11/2005 Scarborough ............ G09B 7/02
706/21
(Continued)

FOREIGN PATENT DOCUMENTS

| WO | WO-2009029802 A2 * | 3/2009 | ............. G06Q 10/10 |
| WO | 2014036442 A1 | 3/2014 | |
| WO | WO-2019108133 A1 * | 6/2019 | ....... G06Q 10/06398 |

OTHER PUBLICATIONS

Zhao et. al, "Employee Turnover Prediction with Machine Learning: A Reliable Approach", 2019, (Year: 2019).*
(Continued)

*Primary Examiner* — Dennis W Ruhl
*Assistant Examiner* — Ivonnemary Rivera Gonzalez
(74) *Attorney, Agent, or Firm* — Harrity & Harrity, LLP

(57) ABSTRACT

A device may receive assessment scores for a candidate associated with an entity and performance data identifying performance metrics and time periods associated with existing members of the entity. The device may process the assessment scores and the performance data, with an attrition model, to identify attrition scores for the candidate and confidences of the attrition scores, and may calculate a final attrition score based on the attrition scores. The device may process the assessment scores and the performance data, with a performance model, to identify performance scores for the candidate and confidences of the performance scores, and may calculate a final performance score based on the performance scores. The device may calculate an overall score based on the final attrition score and the final performance score, and may perform one or more actions based on the overall score.

20 Claims, 10 Drawing Sheets

(58) Field of Classification Search
CPC ............... G06Q 10/107; G06Q 10/109; G06Q 10/1093; G06Q 10/1095; G06Q 10/06398; G06Q 10/06395; G06Q 10/0639; G06Q 10/00; G06Q 10/0631; G06Q 10/063; G06Q 10/06; H04L 12/1818; H04L 12/1813; H04L 12/1822; G06F 40/00

See application file for complete search history.

(56) References Cited

U.S. PATENT DOCUMENTS

| | | | |
|---|---|---|---|
| 2013/0166358 A1* | 6/2013 | Parmar | G06Q 10/06393 705/7.39 |
| 2015/0186817 A1* | 7/2015 | Kim | G06Q 10/0635 705/7.28 |
| 2015/0269244 A1* | 9/2015 | Qamar | G06Q 10/06398 705/7.42 |

OTHER PUBLICATIONS

Faggella, "Machine Learning in Human Resources—Applications and Trends", Apr. 26, 2019 (Year: 2019).*

Karthikeyan et al, "A talent management tool using propensity to leave analytics", 2015 (Year: 2015).*

\* cited by examiner

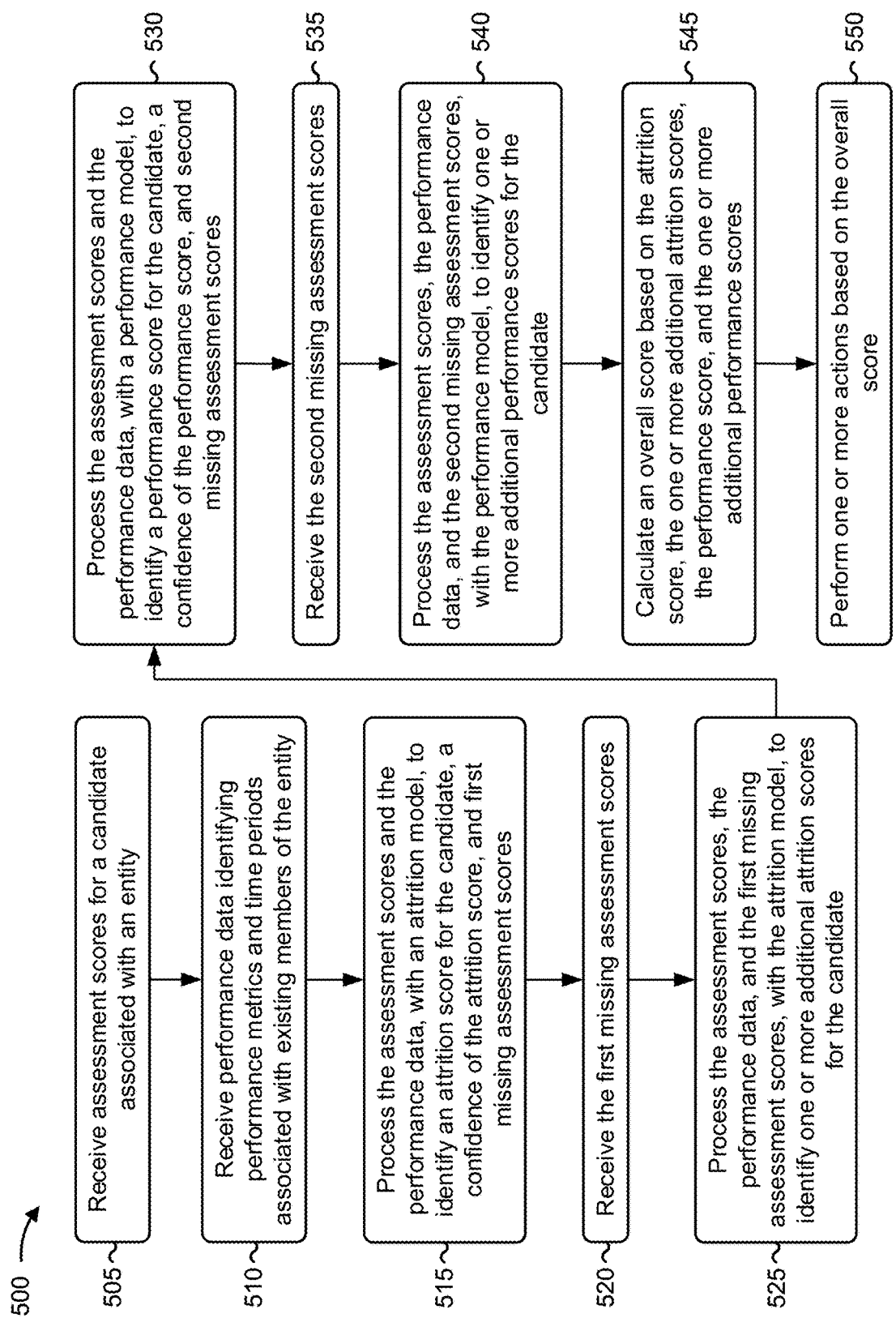

UTILIZING MACHINE LEARNING MODELS FOR MAKING PREDICTIONS

BACKGROUND

A hiring process is a process of reviewing applications for positions, selecting candidates to interview based on the applications, testing the candidates, choosing between the candidates to make a hiring decision, and performing other various pre-employment tests and checks.

SUMMARY

In some implementations, a method may include receiving assessment scores for a candidate associated with an entity, and receiving performance data identifying performance metrics and time periods associated with existing members of the entity. The method may include processing the assessment scores and the performance data, with an attrition model, to identify an attrition score for the candidate, a confidence of the attrition score, and first missing assessment scores, and receiving the first missing assessment scores. The method may include processing the assessment scores, the performance data, and the first missing assessment scores, with the attrition model, to identify one or more additional attrition scores for the candidate. The method may include processing the assessment scores and the performance data, with a performance model, to identify a performance score for the candidate, a confidence of the performance score, and second missing assessment scores, and receiving the second missing assessment scores. The method may include processing the assessment scores, the performance data, and the second missing assessment scores, with the performance model, to identify one or more additional performance scores for the candidate. The method may include calculating an overall score based on the attrition score, the one or more additional attrition scores, the performance score, and the one or more additional performance scores, and performing one or more actions based on the overall score.

In some implementations, a device may include one or more memories and one or more processors to receive assessment scores associated with a candidate applying for a position at an entity, and receive performance data identifying performance metrics and time periods associated with existing members of the entity. The one or more processors may calculate a relevancy score associated with the candidate, and may process the assessment scores, the performance data, and the relevancy score, with an attrition model, to identify an attrition score for the candidate, a confidence of the attrition score, and first missing assessment scores. The one or more processors may receive the first missing assessment scores, and may process the assessment scores, the performance data, the relevancy score, and the first missing assessment scores, with the attrition model, to identify one or more additional attrition scores for the candidate. The one or more processors may process the assessment scores, the performance data, and the relevancy score, with a performance model, to identify a performance score for the candidate, a confidence of the performance score, and second missing assessment scores, and may receive the second missing assessment scores. The one or more processors may process the assessment scores, the performance data, the relevancy score, and the second missing assessment scores, with the performance model, to identify one or more additional performance scores for the candidate. The one or more processors may calculate an overall score based on the attrition score, the one or more additional attrition scores, the performance score, and the one or more additional performance scores, and may perform one or more actions based on the overall score.

In some implementations, a non-transitory computer-readable medium may store a set of instructions that includes one or more instructions that, when executed by one or more processors of a device, cause the device to receive assessment scores associated with a candidate applying for a position at an entity, and receive performance data identifying performance metrics and time periods associated with existing members of the entity. The one or more instructions may cause the device to process the assessment scores and the performance data, with an attrition model, to identify attrition scores for the candidate and confidences of the attrition scores, and calculate a final attrition score based on the attrition scores. The one or more instructions may cause the device to process the assessment scores and the performance data, with a performance model, to identify performance scores for the candidate and confidences of the performance scores, and calculate a final performance score based on the performance scores. The one or more instructions may cause the device to calculate an overall score based on the final attrition score and the final performance score, and perform one or more actions based on the overall score.

BRIEF DESCRIPTION OF THE DRAWINGS

FIG. 5 is a flowchart of an example process for utilizing machine learning models for making predictions.

DETAILED DESCRIPTION

Figure 1A:
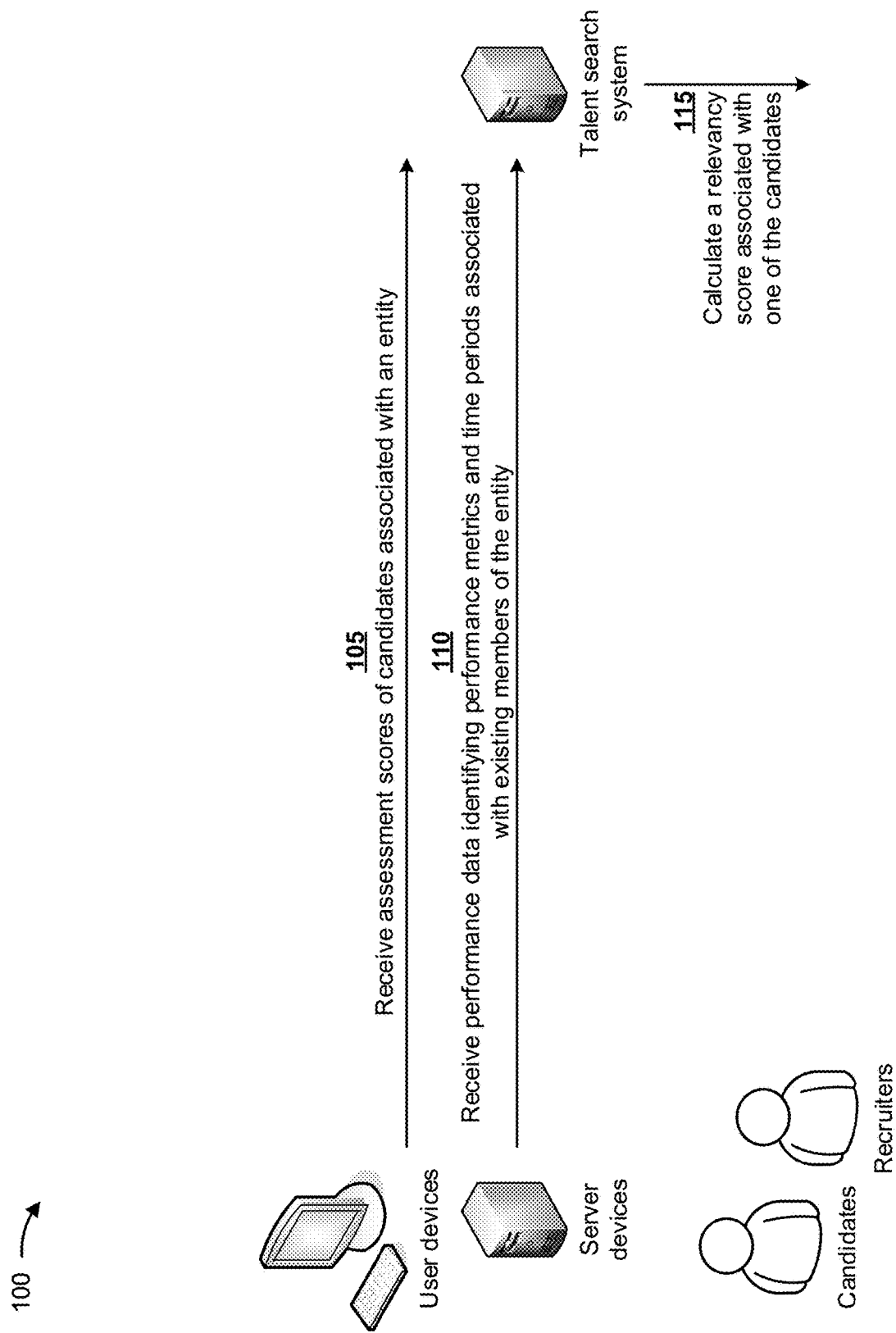
FIGS. 1A-1F are diagrams of an example implementation described herein.

The following detailed description of example implementations refers to the accompanying drawings. The same reference numbers in different drawings may identify the same or similar elements.

Hiring candidates in very technical areas (e.g., data science, artificial intelligence, and/or the like) by large entities (e.g., companies, government agencies, and/or the like) requires significant time and human resource manpower to complete. For example, a large company may receive hundreds of thousands of resumes of candidates for ten thousand positions within the company. A human resources department attempts to manually determine which resumes are relevant while ensuring that candidates remain engaged (e.g., not wait too long for a decision). The human resources department also attempts to manually determine whether a candidate will be successful and remain long term with the company. Such attempts are time consuming, manpower intensive, and often inaccurate. This, in turn, wastes computing resources (e.g., processing resources, memory resources, communication resources, and/or the like), networking resources, and/or the like associated with hiring incorrect candidates with positions, firing the incorrect candidates after a period of time, missing out on qualified candidates due to delay in the hiring process, and/or the like.

Some implementations described herein relate to a talent search system that utilizes machine learning models for making predictions associated with candidates for positions at an entity. For example, the talent search system may receive assessment scores for a candidate associated with an entity, and may receive performance data identifying performance metrics and time periods associated with existing members of the entity. The talent search system may process the assessment scores and the performance data, with an attrition model, to identify an attrition score for the candidate, a confidence of the attrition score, and first missing assessment scores. The talent search system may process the assessment scores, the performance data, and the first missing assessment scores, with the attrition model, to identify one or more additional attrition scores for the candidate. The talent search system may process the assessment scores and the performance data, with a performance model, to identify a performance score for the candidate, a confidence of the performance score, and second missing assessment scores, and may receive the second missing assessment scores. The talent search system may process the assessment scores, the performance data, and the second missing assessment scores, with the performance model, to identify one or more additional performance scores for the candidate. The talent search system may calculate an overall score based on the attrition score, the one or more additional attrition scores, the performance score, and the one or more additional performance scores, and may perform one or more actions based on the overall score.

In this way, the talent search system utilizes machine learning models for making predictions associated with candidates for positions at an entity. The talent search system may utilize the machine learning models with assessment scores (e.g., determined at different stages of the hiring process), existing employee performance data, and resume relevancy data to determine a predicted tenure and performance for a candidate (e.g., a potential employee) at an entity before hiring the candidate. This, in turn, conserves computing resources, networking resources, and/or the like that would otherwise have been wasted in hiring incorrect candidates with positions, firing the incorrect candidates after a period of time, missing out on qualifies candidates due to delay in the hiring process, and/or the like.

FIGS. 1A-1F are diagrams of an example 100 associated with utilizing machine learning models for making predictions associated with candidates for positions at an entity. As shown in FIGS. 1A-1F, example 100 includes user devices and server devices associated with candidates, recruiters (e.g., of an entity), and a talent search system. The user devices may include laptop computers, mobile telephones, desktop computers, and/or the like utilized by the candidates and/or the recruiters. The server devices may include devices that collect and/or determine performance data identifying performance metrics and time periods associated with existing members of the entity. The talent search system may include a system that utilizes machine learning models for making predictions (e.g., for the recruiters) associated with the candidates for positions at the entity.

As shown in FIG. 1A, and by reference number 105, the talent search system may receive, from the user devices and/or the server devices, assessment scores of the candidates associated with the entity. In some implementations, the talent search system may receive the assessment scores at different stages of the hiring process for the candidates. In this way, as the candidate moves through the hiring process, the machine learning models described herein may utilize more accurate assessment scores and may make better predictions. The assessment scores may include scores associated with backgrounds of the candidates, resumes of the candidates, chatbot interactions with the candidates, online interviews with the candidates, talents of the candidates, human resource discussions with the candidates, business interviews with the candidates, employee application forms of the candidates, and/or the like.

The scores associated with the resumes of the candidates and the chatbot interactions with the candidates may include scores associated with locations of the candidates (e.g., geographical locations of the candidates and positions sought by the candidates); former employers of the candidates (e.g., similarities between former companies for which the candidates worked and the entity); relevant experience in capabilities or skills of the candidates (e.g., relevant to capabilities or skills associated with positions of the entity); application channels of the candidates (e.g., social media, employment agencies, employee referrals, direct applications, and/or the like); and/or the like. Such scores may be weighted and combined to generate the scores associated with the resumes of the candidates and the chatbot interactions with the candidates.

The scores associated with the online interviews with the candidates may include scores associated with tone and speech of the candidates (e.g., indicates how comfortable candidates are and if the candidates would fit with the entity, and may include fluency of language used by the candidates, articulation of thought by the candidates, sentence structure utilized by the candidates, key words and grammar utilized by the candidates, and/or the like); body language of the candidates (e.g., indicates comfort levels of the candidates, calmness and focus of the candidates, seriousness of the candidates, professionalism of the candidates, eye movements of the candidates, restlessness of the candidates, and/or the like); and/or the like. Such scores may be weighted and combined to generate the scores associated with the online interviews with the candidates.

The scores associated with the talents of the candidates may identify quality talent that is equipped to drive business outcomes within an evolving landscape. The scores associated with the talents of the candidates may include scores associated with domains of the candidates (e.g., evaluate knowledge of the candidates for positions of the entity); learning agilities of the candidates (e.g., assesses mental abilities of the candidates that determine overall learnability and trainability, such as abilities to acquire and apply knowledge to solve problems and gain proficiency in skills largely independent of academic backgrounds); innovation of the candidates (e.g., whether the candidates generate and implement new and innovative solutions, ideas, and approaches to problems, are strategically minded, are future oriented and anticipate issues before the issues arise, take broad perspectives, and are open to taking calculated risks); critical thinking of the candidates (e.g., whether the candidates critically analyze and evaluate information in a logical way when solving complex problems, break down problems into smaller components, and seek to identify solutions); emotional intelligence of the candidates (e.g., evaluate if the candidates perceive and manage emotions in selves and in others, and whether the candidates relate well to others, with strong interpersonal skills); technical savviness of the candidates (e.g., whether the candidates desire to learn more, are able to learn new technology, information and skills quickly, and are able to apply learned information to new problems); and/or the like. Such scores may be weighted and combined to generate the scores associated with the talents of the candidates.

The scores associated with the human resource discussions with the candidates may assess suitability of the candidates from the human resource perspective and may include scores associated with communication skills of the candidates (e.g., assesses the abilities of the candidates to convey a crux of a topic of discussion, vocabulary, grammar, and the command over the language); attitudes of the candidates (e.g., evaluates eagerness and willingness to learn of the candidates, and check if the candidates are open to new ideas and change); stability of the candidates (e.g., candidates are evaluated to see if the candidates show signs of stability); flexibility and adaptability of the candidates (e.g., assesses whether the candidates can demonstrate flexibility and are adaptable to change); people and/or relationship focus of the candidates (e.g., determine whether the candidates are people and/or relationship focused); and/or the like.

The scores associated with the business interviews with the candidates may assess technical expertise and/or proficiency of the candidates. For example, the scores associated with the business interviews with the candidates may include scores associated with domain knowledge of the candidates (e.g., map experience or knowledge from current or previous roles relevant to roles of positions); client customer knowledge of the candidates (e.g., gauges the candidates on client and customer knowledge); communication skills of the candidates (e.g., assesses the candidate's ability to convey a crux of a topic of discussion, vocabulary, grammar, and command over language); attitudes of the candidates (e.g., evaluates eagerness and willingness to learn of the candidates, and determines whether the candidates are open to new ideas and change); flexibility and adaptability of the candidates (e.g., assesses whether the candidates are able to demonstrate flexibility and are adaptable to change); people and/or relationship focus of the candidates (e.g., assesses whether the candidates are people and/or relationship focused); organization and planning of the candidates (e.g., assesses the candidates based on organization and planning skills); leadership and people management of the candidates (e.g., evaluate the candidates based on leadership style and people management); decision making and result orientation of the candidates (e.g., evaluate the candidates based on decision making skills); cultural fitment of the candidates (e.g., assess if the candidates are right cultural fit for working in the entity); interest level and ability to add value of the candidates (e.g., assessing how the candidates bring value to the entity); and/or the like. Such scores may be weighted and combined to generate the scores associated with the business interviews with the candidates.

The scores associated with the employee application forms of the candidates may include scores associated with universities attended by the candidates (e.g., identifying a correlation between the candidates from universities who are high performers to identify potential high performing candidates); academics of the candidates (e.g., academic scores of the candidates and identifying a correlation between high performing candidates and the academic scores); frequency of changes in organizations by the candidates (e.g., assess whether the candidates are going to have a long career at the entity based past changes in organization by the candidates); reason for leaving prior employers by the candidates (e.g., reasons for changes in organizations by the candidates may indicate what motivates the candidates); and/or the like. Such scores may be weighted and combined to generate the scores associated with the employee application forms of the candidates.

As further shown in FIG. 1A, and by reference number 110, the talent search system may receive, from the user devices and/or the server devices, performance data identifying performance metrics and time periods associated with existing members of the entity. The time periods associated with the existing members may include tenures of the existing members as employees of the entity. The performance data may include data identifying performances of the existing members and may categorize the existing employees into a high performing employee category, a medium performing employee category, and a low performing employee category. In some implementations, the performance data includes data identifying tenures of the existing members for the entity; performance metrics associated with the existing members; feedback from supervisors, clients, and peers about the existing members; role changes associated with the existing members; leave usage associated with the existing members; promotions received by the existing members; recent and past performance by the existing members; performance improvement by the existing members; awards received by the existing members; work hours associated with the existing members; skills added by the existing members; and/or the like.

As further shown in FIG. 1A, and by reference number 115, the talent search system may calculate a relevancy score associated with one of the candidates. The relevancy score may include scores associated with previous employers of the candidate, relevant capabilities or skills of the candidate, a reputation of the candidate, contextual keywords associated with a resume of the candidate, similar skill mappings of the candidate, contextual roles of the candidate, bounce rates associated with the candidate, and/or the like. Such scores may be weighted and combined to generate the relevancy score associated with the candidate.

Figure 1B:
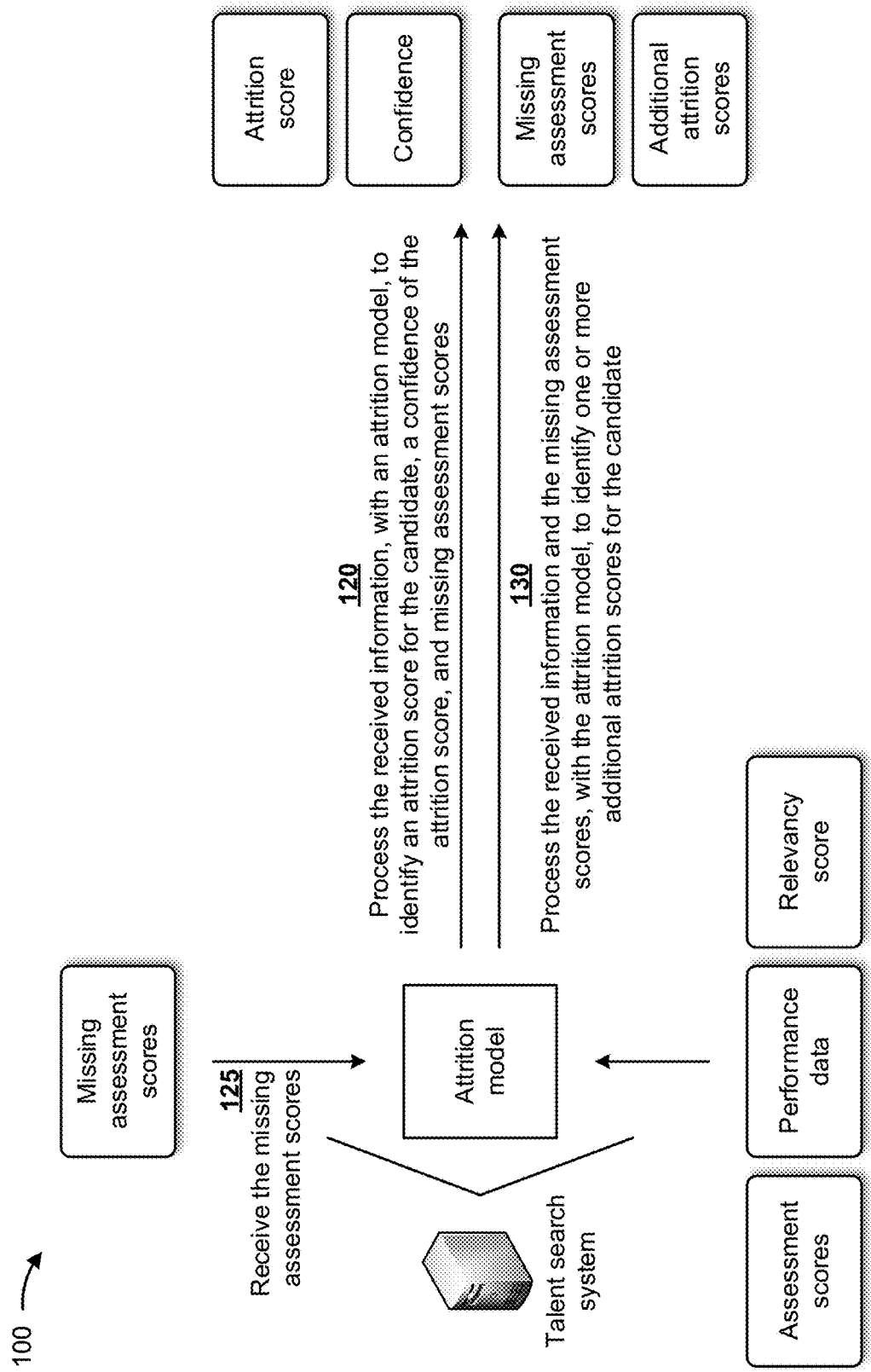

As shown in FIG. 1B, and by reference number 120, the talent search system may process the received information (e.g., the assessment scores, the performance data, and the relevancy score), with an attrition model, to identify an attrition score for the candidate, a confidence of the attrition score, and missing assessment scores. In some implementations, the attrition model includes a random forest model, a linear regression model, a neural network model, a convolutional neural network (CNN) model, a deep neural network (DNN) model, a Siamese network model, and/or another type of machine learning model. The attrition score may provide a prediction of a tenure (e.g., an employment term measured in months, years, and/or the like) of the candidate with the entity. The confidence may provide a degree to which the predicted attrition score is reliable. For example, a confidence that fails to satisfy a threshold value may indicate that the attrition score is not reliable and that the missing assessment scores should be obtained to increase the confidence of the attrition score. In such an example, the talent search system may request the missing assessment scores from the user devices and/or the server devices. In another example, a confidence that satisfies the threshold value may indicate that the attrition score is reliable and that missing assessment scores need not be obtained. In some implementations, no missing assessment scores may be identified if the attrition score is reliable (e.g., the confidence satisfies the threshold value).

As further shown in FIG. 1B, and by reference number 125, the talent search system may receive the missing assessment scores. For example, the talent search system may request and receive the missing assessment scores from the user devices and/or the server devices. The missing assessment scores may include one or more of the assessment scores described above in connection with FIG. 1A.

As further shown in FIG. 1B, and by reference number 130, the talent search system may process the received information (e.g., the assessment scores, the performance data, and the relevancy score) and the missing assessment scores, with the attrition model, to identify one or more additional attrition scores for the candidate. The one or more additional attrition scores may provide predictions of the tenure (e.g., the attrition measured in months, years, and/or the like) of the candidate with the entity.

Figure 1C:
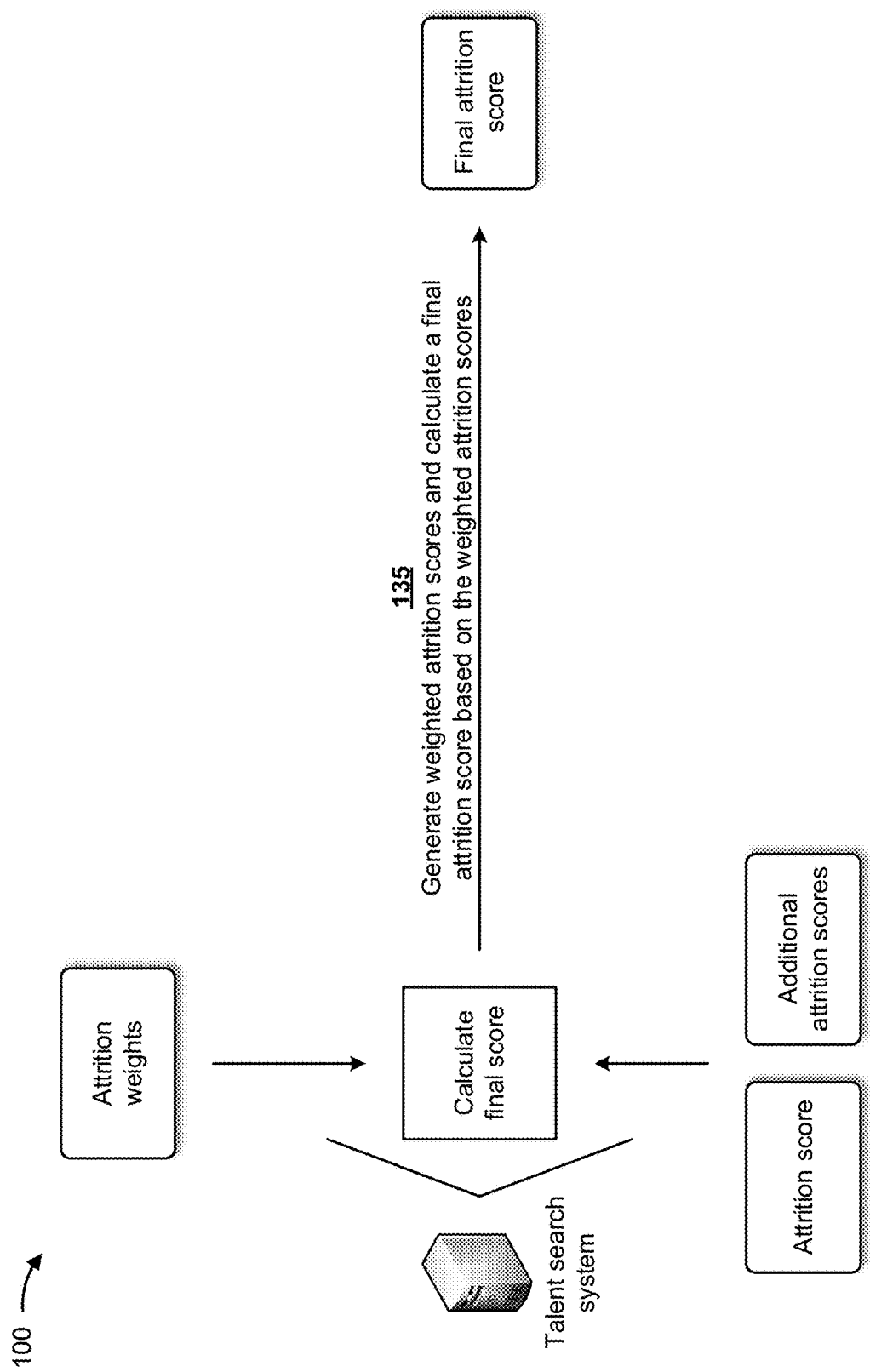

As shown in FIG. 1C, and by reference number 135, the talent search system may generate weighted attrition scores and may calculate a final attrition score based on the weighted attrition scores. In some implementations, the talent search system may receive attrition weights (e.g., decimals, percentages, and/or the like), and may apply the attrition weights to the attrition score and the one or more additional attrition scores to generate weighted attrition scores. The talent search system may then calculate the final attrition score based on the weighted attrition scores. For example, if the attrition score is represented as A1, the one or more additional attrition scores are represented as A2, A3, . . . , An, and the attrition weights are represented as W1, W2, . . . , Wn, then the final attrition score (FA) may be calculated as: $FA=W1*A1+W2*A2+W3*A3+ \ldots +Wn*An$, where $W1+W2+W3+ \ldots +Wn=100\%$.

Figure 1D:
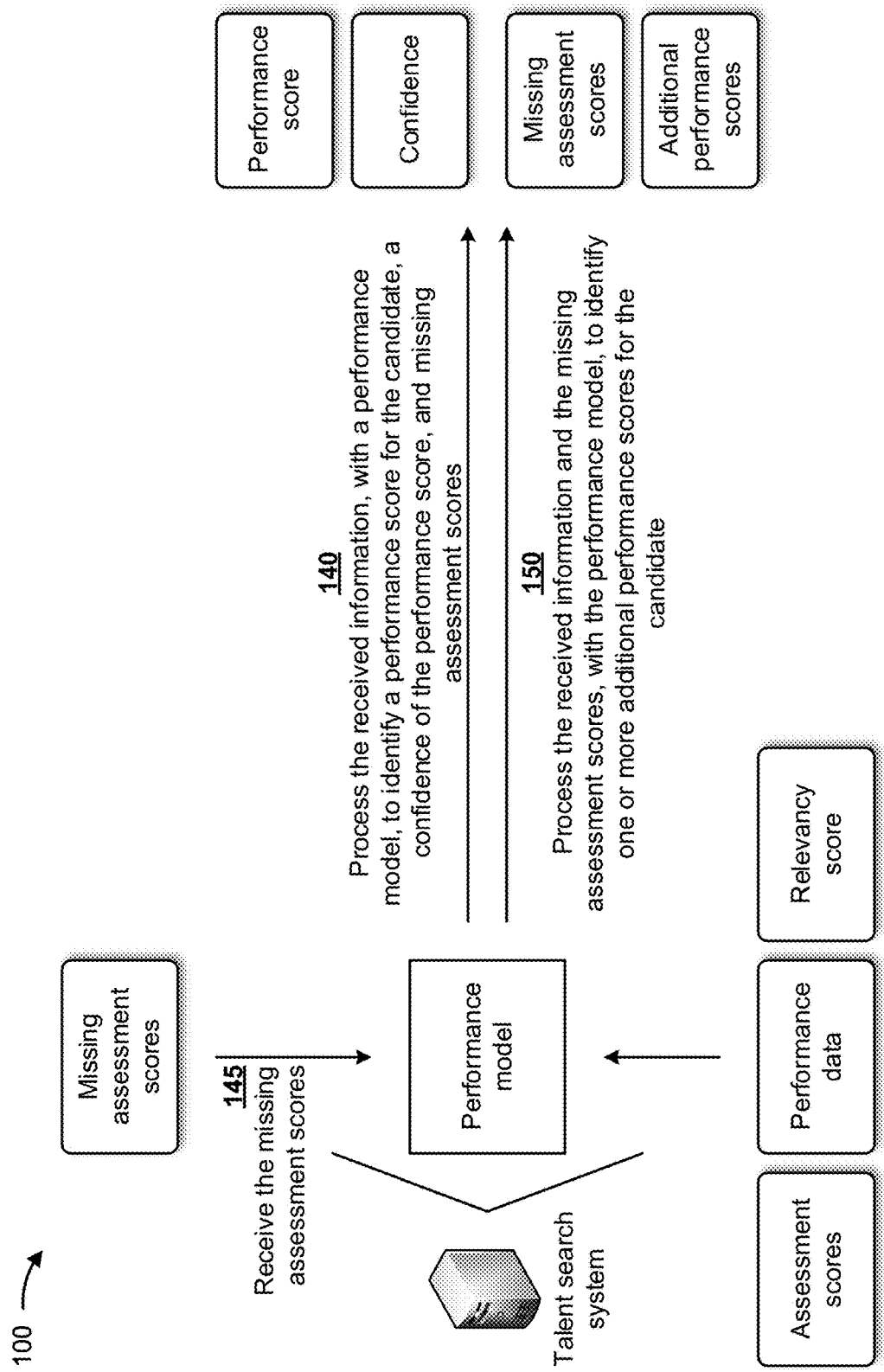

As shown in FIG. 1D, and by reference number 140, the talent search system may process the received information (e.g., the assessment scores, the performance data, and the relevancy score), with a performance model, to identify a performance score for the candidate, a confidence of the performance score, and missing assessment scores. In some implementations, the performance model includes a random forest model, a linear regression model, a neural network model, a CNN model, a DNN model, a Siamese network model, and/or another type of machine learning model. The performance score may provide a prediction of a type of performer (e.g., a high performer, a medium performer, a low performer, and/or the like) of the candidate with the entity. The confidence may provide a degree to which the predicted performance score is reliable. For example, a confidence that fails to satisfy a threshold value may indicate that the performance score is not reliable and that the missing assessment scores should be obtained to increase the confidence of the performance score. In such an example, the talent search system may request the missing assessment scores from the user devices and/or the server devices. In another example, a confidence that satisfies the threshold value may indicate that the performance score is reliable and that missing assessment scores need not be obtained. In some implementations, no missing assessment scores may be identified if the performance score is reliable (e.g., the confidence satisfies the threshold value).

As further shown in FIG. 1D, and by reference number 145, the talent search system may receive the missing assessment scores. For example, the talent search system may request and receive the missing assessment scores from the user devices and/or the server devices. The missing assessment scores may include one or more of the assessment scores described above in connection with FIG. 1A.

As further shown in FIG. 1D, and by reference number 150, the talent search system may process the received information (e.g., the assessment scores, the performance data, and the relevancy score) and the missing assessment scores, with the performance model, to identify one or more additional performance scores for the candidate. The one or more additional performance scores may provide predictions of the type of performer (e.g., high performer, medium performer, low performer, and/or the like) the candidate will be with the entity.

Figure 1E:
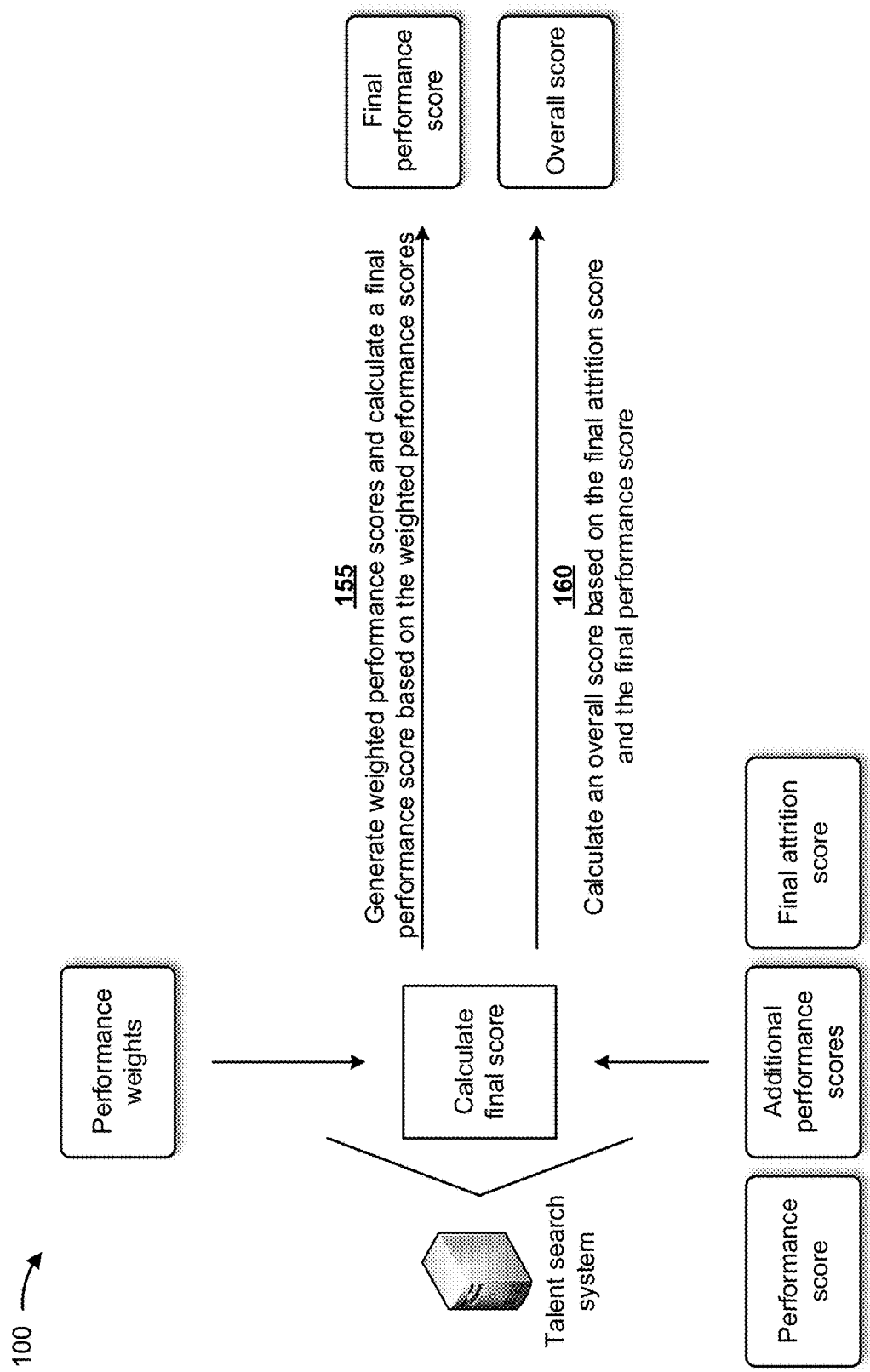

As shown in FIG. 1E, and by reference number 155, the talent search system may generate weighted performance scores and may calculate a final performance score based on the weighted performance scores. In some implementations, the talent search system may receive performance weights (e.g., decimals, percentages, and/or the like), and may apply the performance weights to the performance score and the one or more additional performance scores to generate weighted performance scores. The talent search system may then calculate the final performance score based on the weighted performance scores. For example, if the performance score is represented as P1, the one or more additional performance scores are represented as P2, P3, Pn, and the performance weights are represented as W1, W2, . . . , Wn, then the final performance score (FP) may be calculated as: $FP=W1*P1+W2*P2+W3*P3+ \ldots +Wn*Pn$, where $W1+W2+W3+ \ldots +Wn=100\%$.

As further shown in FIG. 1E, and by reference number 160, the talent search system may calculate an overall score based on the final attrition score and the final performance score. In some implementations, the overall score provides an indication of whether the entity should hire or reject the candidate for a position with the entity. For example, if the overall score satisfies a score threshold, the overall score may provide an indication that the entity should hire the candidate for the position with the entity. Conversely, if the overall score fails to satisfy the score threshold, the overall score may provide an indication that the entity should reject the candidate for the position with the entity.

In some implementations, the talent search system receives, from the user devices and/or the server devices, position data identifying details of the position with the entity. The details of the position may include details identifying a difficulty associated with identifying candidates for the position, an availability of the position at other entities, a complexity associated with the position, a geographical location associated with the position, one or more skills required for the position, years of experience required for the position, and/or the like. In some implementations, the talent search system utilizes the position data with the attrition model and the performance model to identify the attrition score, the one or more additional attrition scores, the performance score, and the one or more additional performance scores. In some implementations, the talent search system utilizes the position data to determine the attrition weights and the performance weights.

Figure 1F:
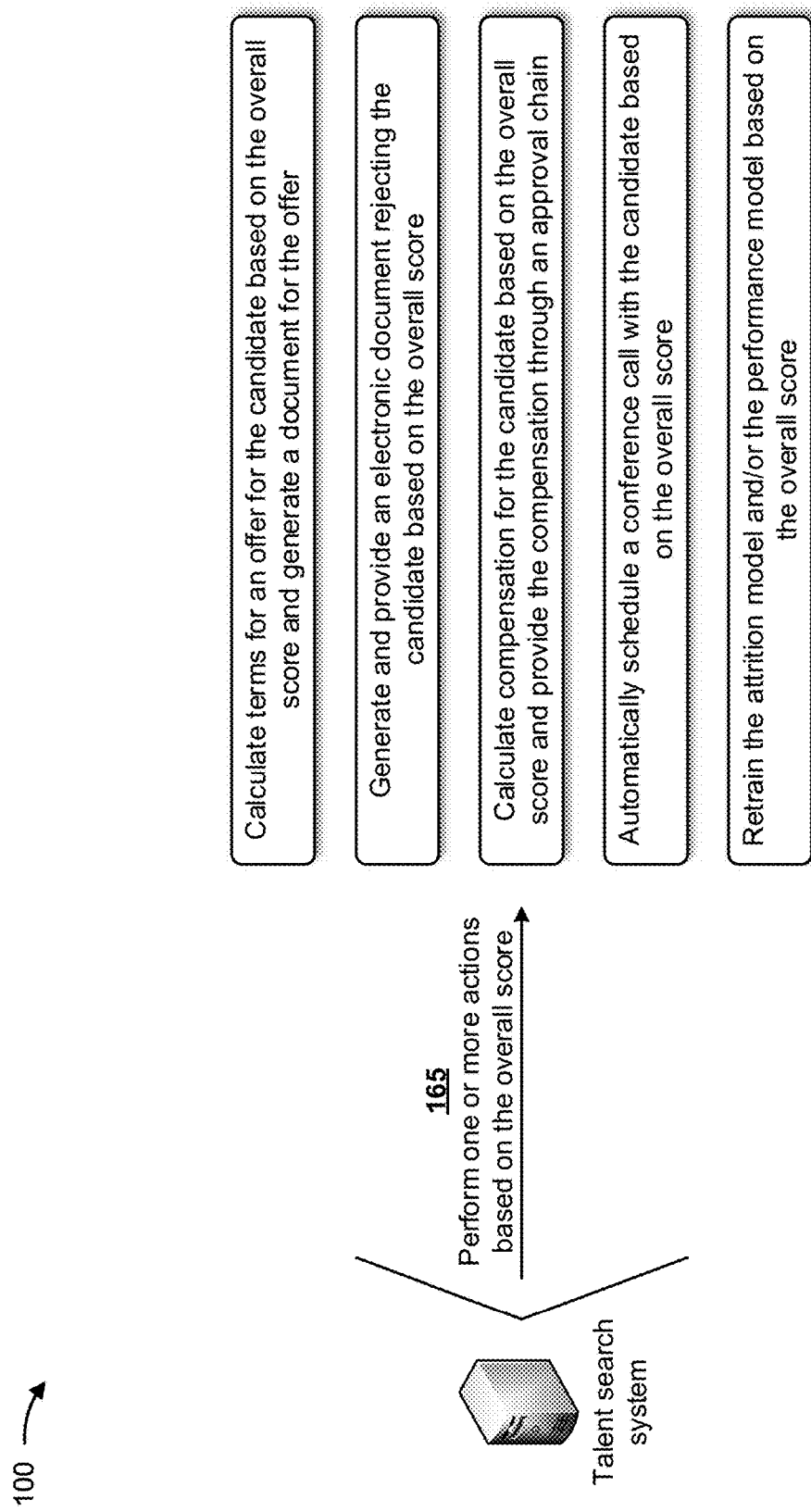

As shown in FIG. 1F, and by reference number 165, the talent search system may perform one or more actions based on the overall score. In some implementations, the one or more actions include the talent search system calculating terms of an offer for the candidate based on the overall score and generating a document for the offer. For example, the talent search system may calculate terms of the offer, such as a salary range for the position, moving expenses for the position, benefits associated with the position, a title of the position, and/or the like, based on the overall score. The talent search system may automatically generate the document for the offer and may provide the document to the candidate (e.g., via regular mail, email, and/or the like). In this way, the talent search system may conserve resources (e.g., computing resources, networking resources, and/or the like) that would otherwise be wasted determining terms of an offer, generating a document for the offer, and/or the like.

In some implementations, the one or more actions include the talent search system generating an electronic document rejecting the candidate based on the overall score and transmitting, via a network, the electronic document to the candidate. For example, the talent search system may determine that the candidate is not qualified for the position based on the overall score, and may generate and transmit the electronic document based on determining that the candidate is not qualified. In this way, the talent search system may conserve resources that would otherwise be wasted attempting to contact the candidate, having the candidate contacting the entity, and/or the like.

In some implementations, the one or more actions include the talent search system calculating compensation for the candidate based on the overall score and transmitting, via a network, data identifying the compensation to a user device, of a series of user devices, that are part of an approval chain. For example, the talent search system may calculate a salary range for the candidate and may provide data identifying the salary range to user devices associated with an approval chain (e.g., that approves salary decisions). In this way, the talent search system conserves resources that would otherwise be wasted in identifying members of the approval chain, and waiting for approval of the salary range for the candidate.

In some implementations, the one or more actions include the talent search system automatically scheduling a conference call with the candidate based on the overall score. For example, the talent search system may schedule a conference call with the candidate so that the candidate can be immediately notified that the candidate is hired or rejected for the position. This may save time and resources of the entity and the candidate associated with the hiring process.

In some implementations, the one or more actions include the talent search system retraining the attrition model and/or the performance model based on the overall score. The talent search system may utilize the overall score as additional training data for retraining the attrition model and/or the performance model, thereby increasing the quantity of training data available for training the attrition model and/or the performance model. Accordingly, the talent search system may conserve computing resources associated with identifying, obtaining, and/or generating historical data for training the attrition model and/or the performance model relative to other systems for identifying, obtaining, and/or generating historical data for training machine learning models.

In this way, the talent search system utilizes machine learning models for making predictions associated with candidates for positions at an entity. The talent search system may utilize the machine learning models with assessment scores, existing employee performance data, and resume relevancy data to determine a predicted tenure and performance for a candidate at an entity before hiring the candidate. This, in turn, conserves computing resources, networking resources, and/or the like that would otherwise have been wasted in hiring incorrect candidates with positions, firing the incorrect candidates after a period of time, missing out on qualifies candidates due to delay in the hiring process, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
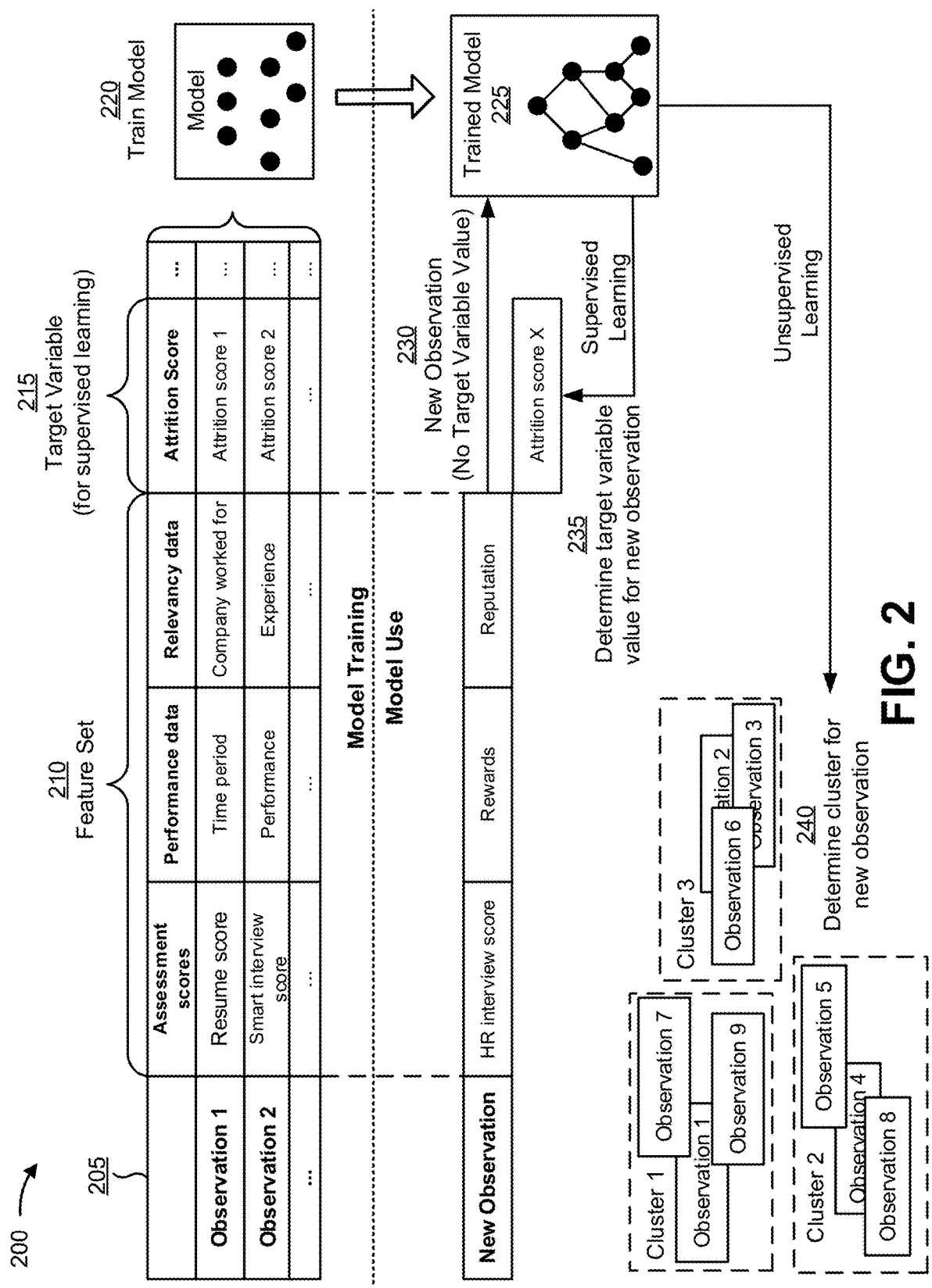
FIG. 2 is a diagram illustrating an example of training and using a machine learning model.

FIG. 2 is a diagram illustrating an example 200 of training and using a machine learning model in connection with making predictions associated with candidates of an entity. The machine learning model training and usage described herein may be performed using a machine learning system. The machine learning system may include or may be included in a computing device, a server, a cloud computing environment, and/or the like, such as the talent search system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the talent search system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the talent search system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of assessment scores, a second feature of performance data, a third feature of relevancy data, and so on. As shown, for a first observation, the first feature may have a value of a resume score, the second feature may have a value of a time period, the third feature may have a value of a company worked for, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is an attrition score, which has a value of attrition score 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of a human resources (HR) interview score, a second feature of rewards, a third feature of a reputation, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of attrition score X for the target variable of attrition score for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an assessment score cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a performance data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to make predictions associated with candidates of an entity. The machine learning system enables recognition and/or identification of tens, hundreds, thousands, or millions of features and/or feature values for tens, hundreds, thousands, or millions of observations, thereby increasing accuracy and consistency and reducing delay associated with making predictions for candidates of an entity relative to requiring computing resources to be allocated for tens, hundreds, or thousands of operators to manually make predictions associated with candidates of an entity.

As indicated above, FIG. 2 is provided as an example. Other examples may differ from what is described in connection with FIG. 2.

Figure 3:
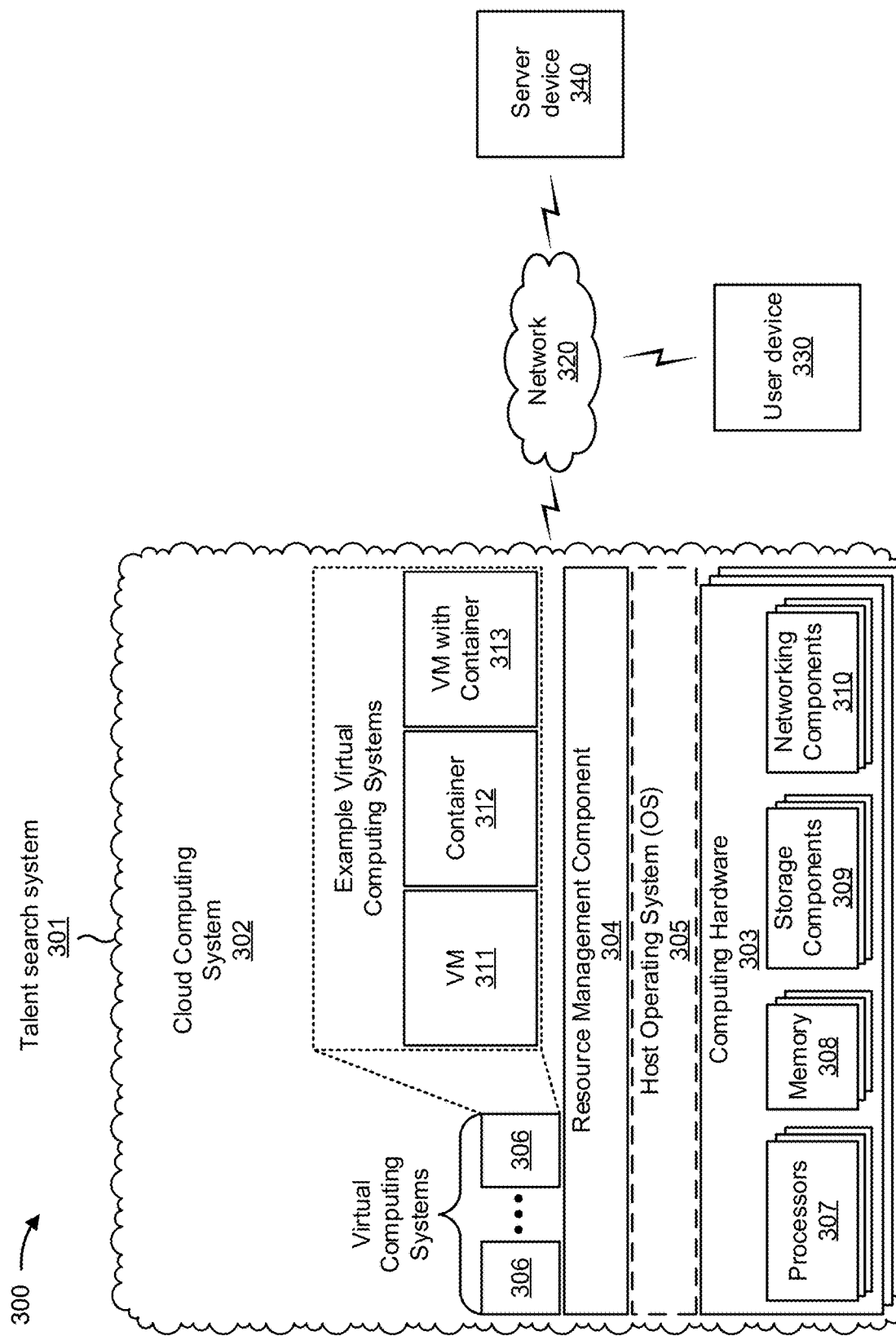
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a talent search system 301, which may include one or more elements of and/or may execute within a cloud computing system 302. The cloud computing system 302 may include one or more elements 303-313, as described in more detail below. As further shown in FIG. 3, environment 300 may include a network 320, a user device 330, and/or a server device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the talent search system 301 may include one or more elements 303-313 of the cloud computing system 302, may execute within the cloud computing system 302, and/or may be hosted within the cloud computing system 302, in some implementations, the talent search system 301 may not be cloud-based (e.g., may be implemented outside of a cloud computing system) or may be partially cloud-based. For example, the talent search system 301 may include one or more devices that are not part of the cloud computing system 302, such as device 400 of FIG. 4, which may include a standalone server or another type of computing device. The talent search system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device 330 includes one or more devices capable of receiving, generating, storing, processing, and/or providing information associated with assessment scores of candidates associated with an entity, as described elsewhere herein. User device 330 may include a communication device and/or a computing device. For example, user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 330 may communicate with one or more other devices of environment 300, as described elsewhere herein.

Server device 340 includes one or more devices capable of receiving, generating, storing, processing, providing, and/or routing information associated with receiving and/or determining performance data identifying performance metrics and time periods associated with existing members of an entity, as described elsewhere herein. Server device 340 may include a communication device and/or a computing device. For example, server device 340 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Server device 340 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
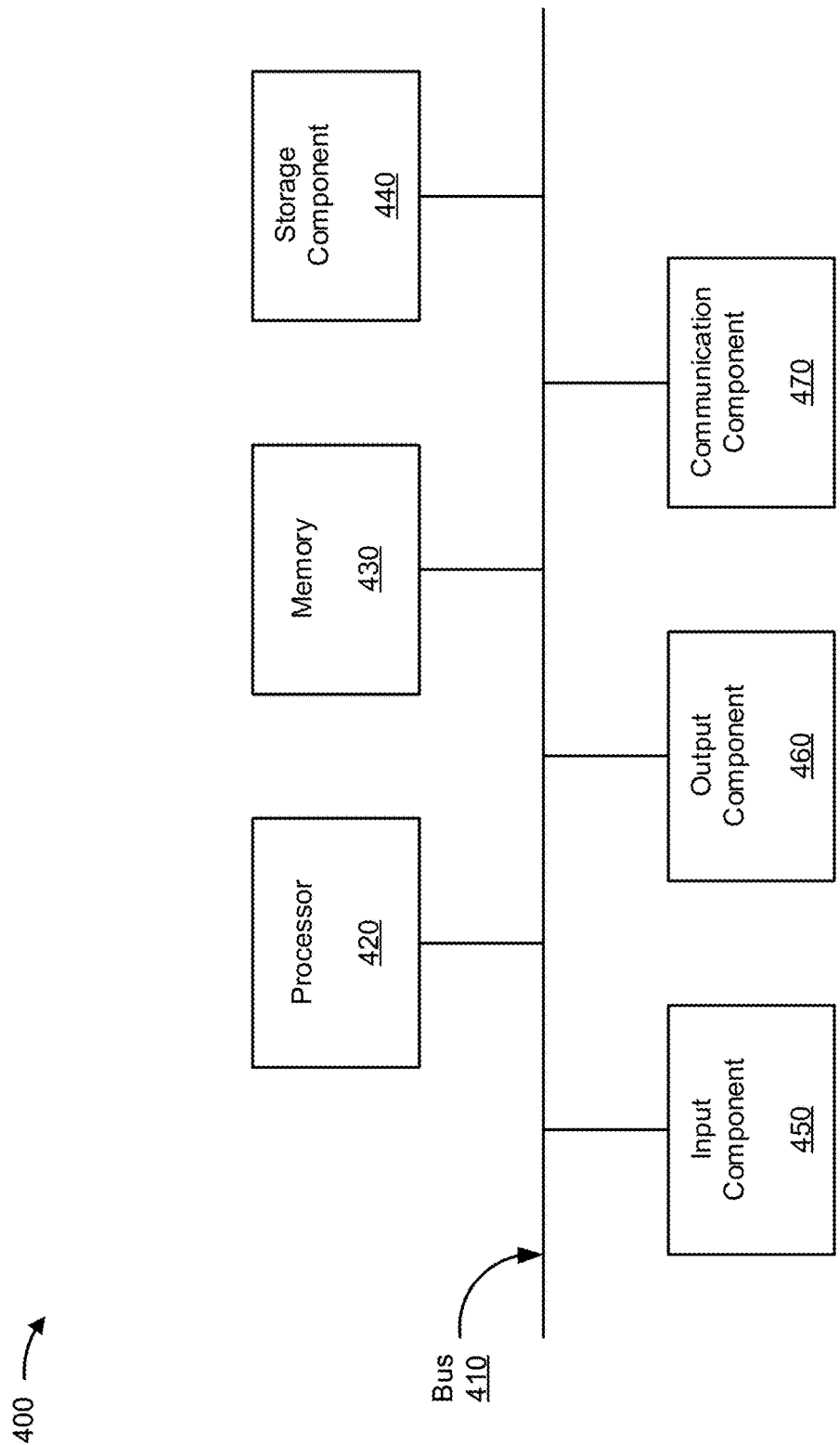
FIG. 4 is a diagram of example components of one or more devices of FIG. 3.

FIG. 4 is a diagram of example components of a device 400, which may correspond to talent search system 301, user device 330, and/or server device 340. In some implementations, talent search system 301, user device 330, and/or server device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for utilizing machine learning models for making predictions. In some implementations, one or more process blocks of FIG. 5 may be performed by a device (e.g., talent search system 301). In some implementations, one or more process blocks of FIG. 5 may be performed by another device or a group of devices separate from or including the device, such as a server device (e.g., server device 340). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving assessment scores for a candidate associated with an entity (block 505). For example, the device may receive assessment scores for a candidate associated with an entity, as described above.

As further shown in FIG. 5, process 500 may include receiving performance data identifying performance metrics and time periods associated with existing members of the entity (block 510). For example, the device may receive performance data identifying performance metrics and time periods associated with existing members of the entity, as described above.

As further shown in FIG. 5, process 500 may include processing the assessment scores and the performance data, with an attrition model, to identify an attrition score for the candidate, a confidence of the attrition score, and first missing assessment scores (block 515). For example, the device may process the assessment scores and the performance data, with an attrition model, to identify an attrition score for the candidate, a confidence of the attrition score, and first missing assessment scores, as described above.

As further shown in FIG. 5, process 500 may include receiving the first missing assessment scores (block 520). For example, the device may receive the first missing assessment scores, as described above.

As further shown in FIG. 5, process 500 may include processing the assessment scores, the performance data, and the first missing assessment scores, with the attrition model, to identify one or more additional attrition scores for the candidate (block 525). For example, the device may process the assessment scores, the performance data, and the first missing assessment scores, with the attrition model, to identify one or more additional attrition scores for the candidate, as described above.

As further shown in FIG. 5, process 500 may include processing the assessment scores and the performance data, with a performance model, to identify a performance score for the candidate, a confidence of the performance score, and second missing assessment scores (block 530). For example, the device may process the assessment scores and the performance data, with a performance model, to identify a performance score for the candidate, a confidence of the performance score, and second missing assessment scores, as described above.

As further shown in FIG. 5, process 500 may include receiving the second missing assessment scores (block 535). For example, the device may receive the second missing assessment scores, as described above.

As further shown in FIG. 5, process 500 may include processing the assessment scores, the performance data, and the second missing assessment scores, with the performance model, to identify one or more additional performance scores for the candidate (block 540). For example, the device may process the assessment scores, the performance data, and the second missing assessment scores, with the performance model, to identify one or more additional performance scores for the candidate, as described above.

As further shown in FIG. 5, process 500 may include calculating an overall score based on the attrition score, the one or more additional attrition scores, the performance score, and the one or more additional performance scores (block 545). For example, the device may calculate an overall score based on the attrition score, the one or more additional attrition scores, the performance score, and the one or more additional performance scores, as described above.

As further shown in FIG. 5, process 500 may include performing one or more actions based on the overall score (block 550). For example, the device may perform one or more actions based on the overall score, as described above.

Process 500 may include additional implementations, such as any single implementation or any combination of implementations described below and/or in connection with one or more other processes described elsewhere herein.

In a first implementation, calculating the overall score include applying first weights to the attrition score and the one or more additional attrition scores to generate weighted attrition scores; calculating a final attrition score based on the weighted attrition scores; applying second weights to the performance score and the one or more additional performance scores to generate weighted performance scores; calculating a final performance score based on the weighted performance scores; and calculating the overall score based on the final attrition score and the final performance score.

In a second implementation, alone or in combination with the first implementation, performing the one or more actions includes calculating terms of an offer for the candidate based on the overall score and generating a document for the offer; generating an electronic document rejecting the candidate based on the overall score and transmitting, via a network, the electronic document to the candidate; or calculating compensation for the candidate based on the overall score and transmitting, via the network, data identifying the compensation to a user device, of a series of user devices, that are part of an approval chain.

In a third implementation, alone or in combination with one or more of the first and second implementations, performing the one or more actions includes automatically scheduling a conference call with the candidate based on the overall score, or retraining the attrition model or the performance model based on the overall score.

In a fourth implementation, alone or in combination with one or more of the first through third implementations, one or more of the attrition model or the performance model is a random forest model.

In a fifth implementation, alone or in combination with one or more of the first through fourth implementations, process 500 includes calculating a relevancy score associated with the candidate, and identifying the attrition score, the one or more additional attrition scores, the performance score, and the one or more additional performance scores based on the relevancy score.

In a sixth implementation, alone or in combination with one or more of the first through fifth implementations, calculating the relevancy score includes calculating the relevancy score based on entities with which the candidate is associated; calculating the relevancy score based on relevant experience in a skill by the candidate; calculating the relevancy score based on similarity of the skill to a skill required by the entity; or calculating the relevancy score based on similarity of a prior position of the candidate to a position associated with the entity.

In a seventh implementation, alone or in combination with one or more of the first through sixth implementations, the assessment scores include an assessment score associated with credentials of the candidate; an assessment score associated with an interview of the candidate; an assessment score associated with one or more of a domain, a learning agility, an innovation, critical thinking, an emotional intelligence, or a technical savviness of the candidate; or an assessment score associated with an application form of the candidate.

In an eighth implementation, alone or in combination with one or more of the first through ninth implementations, the performance data includes data identifying performance metrics associated with the existing members, changes associated with the existing members, leaving usage associated with the existing members, promotions received by the existing members, awards received by the existing members, or working hours associated with the existing members.

In a ninth implementation, alone or in combination with one or more of the first through eighth implementations, the attrition score and the one or more additional attrition scores each provide an indication of a predicted time period of the candidate as a member with the entity.

In a tenth implementation, alone or in combination with one or more of the first through ninth implementations, process 500 includes receiving position data identifying details of the position, and identifying the attrition score, the one or more additional attrition scores, the performance score, and the one or more additional performance scores based on the position data.

In an eleventh implementation, alone or in combination with one or more of the first through tenth implementations, the details of the position include a difficulty associated with identifying candidates for the position, an availability of the position at other entities, a complexity associated with the position, a geographical location associated with the position, one or more skills required for the position, or years of experience required for the position.

In a twelfth implementation, alone or in combination with one or more of the first through eleventh implementations, process 500 includes receiving position data identifying details of the position; determining first weights and second weights based on the position data; applying the first weights to the attrition score and the one or more additional attrition scores to generate weighted attrition scores; calculating a final attrition score based on the weighted attrition scores; applying the second weights to the performance score and the one or more additional performance scores to generate weighted performance scores; calculating a final performance score based on the weighted performance scores; and calculating the overall score based on the final attrition score and the final performance score.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, assessment scores for a candidate associated with an entity;
   receiving, by the device, performance data identifying performance metrics and time periods associated with existing members of the entity;
   processing, by the device, the assessment scores and the performance data, with an attrition model, to identify an attrition score for the candidate, a confidence of the attrition score, and first missing assessment scores;
   receiving, by the device, the first missing assessment scores;
   processing, by the device, the assessment scores, the performance data, and the first missing assessment scores, with the attrition model, to identify one or more additional attrition scores for the candidate;
   processing, by the device, the assessment scores and the performance data, with a performance model, to identify a performance score for the candidate, a confidence of the performance score, and second missing assessment scores;
   receiving, by the device, the second missing assessment scores;
   processing, by the device, the assessment scores, the performance data, and the second missing assessment scores, with the performance model, to identify one or more additional performance scores for the candidate,
      wherein the performance model and the attrition model are included in one or more machine learning models that are trained based on a first set of observations associated with a target variable that represents a value that the one or more machine learning models are being trained to predict,
      wherein the first set of observations include the assessment scores and the first set of observations are obtained from historical data,
      wherein the one or more machine learning models are further trained based on a second set of observations that are not associated with the target variable,
      wherein a cluster associated with at least one of the first set of observations or the second set of observations is identified based on the one or more machine learning models,
      wherein one or more sets of observations, including at least one of the first set of observations or the second set of observations, in the identified cluster satisfy a threshold degree of similarity, and
      wherein the one or more machine learning models provide a recommendation based on the identified cluster;
   calculating, by the device, an overall score based on the attrition score, the one or more additional attrition scores, the performance score, and the one or more additional performance scores; and
   performing, by the device and based on using the overall score as additional training data, one or more actions that include retraining the one or more machine learning models.

2. The method of claim 1, wherein calculating the overall score comprises:
   applying first weights to the attrition score and the one or more additional attrition scores to generate weighted attrition scores;
   calculating a final attrition score based on the weighted attrition scores;
   applying second weights to the performance score and the one or more additional performance scores to generate weighted performance scores;
   calculating a final performance score based on the weighted performance scores; and
   calculating the overall score based on the final attrition score and the final performance score.

3. The method of claim 1, wherein performing the one or more actions comprises one or more of:
   calculating terms of an offer for the candidate based on the overall score and generating a document for the offer;
   generating an electronic document rejecting the candidate based on the overall score and transmitting, via a network, the electronic document to the candidate; or
   calculating compensation for the candidate based on the overall score and transmitting, via the network, data identifying the compensation to a user device, of a series of user devices, that are part of an approval chain.

4. The method of claim 1, wherein performing the one or more actions comprises one or more of:
   automatically scheduling a conference call with the candidate based on the overall score; or
   retraining the attrition model or the performance model based on the overall score.

5. The method of claim 1, wherein one or more of the attrition model or the performance model is a random forest model.

6. The method of claim 1, further comprising:
   calculating a relevancy score associated with the candidate; and
   identifying the attrition score, the one or more additional attrition scores, the performance score, and the one or more additional performance scores based on the relevancy score.

7. The method of claim 6, wherein calculating the relevancy score comprises one or more of:
   calculating the relevancy score based on entities with which the candidate is associated;
   calculating the relevancy score based on relevant experience in a skill by the candidate;
   calculating the relevancy score based on similarity of the skill to a skill required by the entity; or
   calculating the relevancy score based on similarity of a prior position of the candidate to a position associated with the entity.

8. A device, comprising:
   one or more memories; and
   one or more processors, communicatively coupled to the one or more memories, configured to:
      receive assessment scores associated with a candidate applying for a position at an entity;
      receive performance data identifying performance metrics and time periods associated with existing members of the entity;
      calculate a relevancy score associated with the candidate;

process the assessment scores, the performance data, and the relevancy score, with an attrition model, to identify an attrition score for the candidate, a confidence of the attrition score, and first missing assessment scores;
receive the first missing assessment scores;
process the assessment scores, the performance data, the relevancy score, and the first missing assessment scores, with the attrition model, to identify one or more additional attrition scores for the candidate;
process the assessment scores, the performance data, and the relevancy score, with a performance model, to identify a performance score for the candidate, a confidence of the performance score, and second missing assessment scores;
receive the second missing assessment scores;
process the assessment scores, the performance data, the relevancy score, and the second missing assessment scores, with the performance model, to identify one or more additional performance scores for the candidate,
wherein the performance model and the attrition model are included in one or more machine learning models that are trained based on a first set of observations associated with a target variable that represents a value that the one or more machine learning models are being trained to predict,
wherein the first set of observations include the assessment scores and the first set of observations are obtained from historical data,
wherein the one or more machine learning models are further trained based on a second set of observations that are not associated with the target variable,
wherein a cluster associated with at least one of the first set of observations or the second set of observations is identified the on the one or more machine learning models,
wherein one or more sets of observations, including at least one of the first set of observations or the second set of observations, in the identified cluster satisfy a threshold degree of similarity, and
wherein the one or more machine learning models provide a recommendation based on the identified cluster;
calculate an overall score based on the attrition score, the one or more additional attrition scores, the performance score, and the one or more additional performance scores; and
perform, based on using the overall score as additional training data, one or more actions that include retraining the one or more machine learning models.

9. The device of claim 8, wherein the assessment scores include one or more of:
an assessment score associated with credentials of the candidate,
an assessment score associated with an interview of the candidate,
an assessment score associated with one or more of a domain, a learning agility, an innovation, critical thinking, an emotional intelligence, or a technical savviness of the candidate, or
an assessment score associated with an application form of the candidate.

10. The device of claim 8, wherein the performance data includes data identifying one or more of:
performance metrics associated with the existing members,
changes associated with the existing members,
leave usage associated with the existing members,
promotions received by the existing members,
awards received by the existing members, or
work hours associated with the existing members.

11. The device of claim 8, wherein the attrition score and the one or more additional attrition scores each provide an indication of a predicted time period of the candidate as a member with the entity.

12. The device of claim 8, wherein the one or more processors are further configured to:
receive position data identifying details of the position; and
identify the attrition score, the one or more additional attrition scores, the performance score, and the one or more additional performance scores based on the position data.

13. The device of claim 12, wherein the details of the position include one or more of:
a difficulty associated with identifying candidates for the position,
an availability of the position at other entities,
a complexity associated with the position,
a geographical location associated with the position,
one or more skills required for the position, or
years of experience required for the position.

14. The device of claim 8, wherein the one or more processors are further configured to:
receive position data identifying details of the position;
determine first weights and second weights based on the position data;
apply the first weights to the attrition score and the one or more additional attrition scores to generate weighted attrition scores;
calculate a final attrition score based on the weighted attrition scores;
apply the second weights to the performance score and the one or more additional performance scores to generate weighted performance scores;
calculate a final performance score based on the weighted performance scores; and
calculate the overall score based on the final attrition score and the final performance score.

15. A non-transitory computer-readable medium storing a set of instructions, the set of instructions comprising:
one or more instructions that, when executed by one or more processors of a device, cause the device to:
receive assessment scores associated with a candidate applying for a position at an entity;
receive performance data identifying performance metrics and time periods associated with existing members of the entity;
process the assessment scores and the performance data, with an attrition model, to identify attrition scores for the candidate and confidences of the attrition scores;
calculate a final attrition score based on the attrition scores;
process the assessment scores and the performance data, with a performance model, to identify performance scores for the candidate and confidences of the performance scores, wherein the performance model and the attrition model are included in one or more machine learning models that are trained based on a first set of observations associated with a target variable that represents a value that the one or more machine learning models are being trained to predict, wherein the first set of observations include the assessment scores and the first set of observations are obtained from historical data, wherein the one or more machine learning models are further trained based on a second set of observations that are not associated with the target variable, wherein a cluster associated with at least one of the first set of observations or the second set of observations is identified based on the one or more machine learning models, wherein one or more sets of observations, including at least one of the first set of observations or the second set of observations, in the identified cluster satisfy a threshold degree of similarity, and wherein the one or more machine learning models provide a recommendation based on the identified cluster;

calculate a final performance score based on the performance scores;

calculate an overall score based on the final attrition score and the final performance score; and perform, based on using the overall score as additional training data, one or more actions that include retraining the one or more machine learning models.

16. The non-transitory computer-readable medium of claim 15, wherein the one or more instructions further cause the device to:

apply first weights to the attrition scores to generate weighted attrition scores;

calculate the final attrition score based on the weighted attrition scores;

apply second weights to the performance scores to generate weighted performance scores; and calculate the final performance score based on the weighted performance scores.

17. The non-transitory computer-readable medium of claim 15, wherein the one or more instructions, that cause the device to perform the one or more actions, cause the device to:

calculate terms of an offer for the candidate based on the overall score and generate a document for the offer;

generate an electronic document rejecting the candidate based on the overall score and transmit, via a network, the electronic document to the candidate; or calculate compensation for the candidate based on the overall score and transmit, via the network, data identifying the compensation to a user device, of a series of user devices, that are part of an approval chain;

automatically schedule a conference call with the candidate based on the overall score; or retrain the attrition model or the performance model based on the overall score.

18. The non-transitory computer-readable medium of claim 15, wherein the one or more instructions further cause the device to:

calculate a relevancy score associated with the candidate; and identify the attrition scores and the performance scores based on the relevancy score.

19. The non-transitory computer-readable medium of claim 15, wherein the attrition scores each provide an indication of a predicted time period of the candidate as a member with the entity.

20. The non-transitory computer-readable medium of claim 15, wherein the one or more instructions further cause the device to:

receive position data identifying details of the position; and identify the attrition score scores and the performance scores based on the position data.

* * * * *